US012761662B2

(12) United States Patent
Armand et al.

(10) Patent No.: US 12,761,662 B2
(45) Date of Patent: Oct. 13, 2026

(54) METHOD FOR MODELLING A NAVIGATION ENVIRONMENT OF A MOTOR VEHICLE

(71) Applicant: RENAULT S.A.S., Boulogne Billancourt (FR)

(72) Inventors: Alexandre Armand, Guyancourt (FR); Javier Ibanez-Guzman, Guyancourt (FR)

(73) Assignee: RENAULT S.A.S., Boulogne Billancourt (FR)

(*) Notice: Subject to any disclaimer, the term of this patent is extended or adjusted under 35 U.S.C. 154(b) by 124 days.

(21) Appl. No.: 18/684,978

(22) PCT Filed: Jul. 25, 2022

(86) PCT No.: PCT/EP2022/070730
§ 371 (c)(1),
(2) Date: May 31, 2024

(87) PCT Pub. No.: WO2023/025490
PCT Pub. Date: Mar. 2, 2023

(65) Prior Publication Data

US 2025/0284287 A1 Sep. 11, 2025

(30) Foreign Application Priority Data

Aug. 25, 2021 (FR) ..................................... 21 08909

(51) Int. Cl.
*B60W 60/00* (2020.01)
*G05D 1/606* (2024.01)

(52) U.S. Cl.
CPC ........... *G05D 1/606* (2024.01); *B60W 60/001* (2020.02)

(58) Field of Classification Search
CPC ...... G05D 1/606; G05D 1/0246; G05D 1/243; G05D 1/644; G05D 2101/10;
(Continued)

(56) References Cited

U.S. PATENT DOCUMENTS

| | | | | |
|---|---|---|---|---|
| 11,698,272 B2 * | 7/2023 | Kroepfl | G01S 13/865 | 701/409 |
| 11,733,703 B2 * | 8/2023 | Anthony | B60W 60/0015 | 701/23 |

(Continued)

FOREIGN PATENT DOCUMENTS

EP 3 543 906 A1 9/2019

OTHER PUBLICATIONS

International Search Report issued Oct. 27, 2022 in PCT/EP2022/070730, filed on Jul. 25, 2022, 2 pages.

(Continued)

*Primary Examiner* — Masud Ahmed
(74) *Attorney, Agent, or Firm* — Oblon, McClelland, Maier & Neustadt, L.L.P.

(57) ABSTRACT

A method models a navigation environment of a vehicle equipped with environment perception structure, with a decision module, and with an autonomous controller for autonomously controlling the vehicle. The method includes defining a global environment model of the vehicle as being a structured set of information constructed from data supplied by the environment perception structure, and receiving, from the decision module, a request for information relating to a decision to be taken to control the vehicle by way of the autonomous controller.

8 Claims, 3 Drawing Sheets

(58) Field of Classification Search
CPC ........... G05D 2109/10; B60W 60/001; B60W 40/02; B60W 60/00; B60W 40/00; G06V 20/56
See application file for complete search history.

(56) References Cited

U.S. PATENT DOCUMENTS

| | | | | |
|---|---|---|---|---|
| 11,764,991 | B2 * | 9/2023 | Park | H04L 12/2812 709/224 |
| 2019/0295003 | A1 * | 9/2019 | Dronen | G05D 1/0221 |
| 2020/0331495 | A1 * | 10/2020 | Bracquemond | B60W 60/0016 |
| 2021/0216076 | A1 * | 7/2021 | Nayak | G06N 20/20 |
| 2023/0342456 | A1 * | 10/2023 | Ansari | G06F 21/602 |

OTHER PUBLICATIONS

French Preliminary Search Report issued Apr. 29, 2022 in FR Application 21 08909, filed on Aug. 25, 2021, 3 pages (with English Translation of Category of Cited Documents).

* cited by examiner

METHOD FOR MODELLING A NAVIGATION ENVIRONMENT OF A MOTOR VEHICLE

BACKGROUND

The invention relates to a method for a modeling navigation environment of a motor vehicle. The invention further relates to a device for modeling a navigation environment of a motor vehicle. The invention also relates to a computer program implementing the aforementioned method. Finally, the invention relates to a storage medium that stores such a program.

An autonomous vehicle is continuously called upon to make decisions concerning its current situation. Therefore, determining the situation of autonomous current the vehicle is essential for decision-making. The current situation of the vehicle is conventionally obtained by means for perceiving the environment of the vehicle, such as Lidars, radars or cameras. These provide a significant amount of data, most of which is not useful for describing the current situation of the vehicle with a view to making a decision. Another portion of these data can include errors or inaccuracies. Finally, although motor vehicles are fitted with an ever-increasing number of environment perception means, some data can be missing for describing a situation.

A method is known from document U.S. Pat. No. 10,860,022 that adapts to the current situation of the autonomous vehicle, notably by identifying the key information contained in the data originating from the perception means of the vehicle. However, this solution has disadvantages, in particular in terms of managing the consistency and the reliability of the information.

BRIEF SUMMARY

The aim of the invention is to provide a device and a method for modeling a navigation environment of a motor vehicle, overcoming the aforementioned disadvantages and improving the devices and methods for modeling a navigation environment of a motor vehicle known from the prior art. In particular, the invention allows a device and a method to be produced that are simple and reliable and that allow reliable, consistent and relevant modeling of a navigation environment of a motor vehicle.

To this end, the invention relates to a method for modeling a navigation environment of a vehicle equipped with environment perception means, a decision-making module and an autonomous control means for autonomously controlling the vehicle, comprising the following steps:

- a step of defining an overall environmental model of the vehicle as being a set of structured information constructed from data provided by the environment perception means;
- a step of receiving, from the decision-making module, a request for information relating to a decision to be taken for controlling the vehicle by the autonomous control means;
- a step of determining, from among the set of structured information defining the environmental model, a selection of information to be consulted in order to take said decision;
- a step of consulting the information from said selection from the overall environmental model;
- a step of determining an integrity index associated with each item of information of said selection;

- a step of providing said decision-making module with a selective environmental model containing the information from said selection and the corresponding integrity indices.

The method can comprise a step of acquiring at least one first item of information from said selection of information using a first environment perception means and using a second environment perception means, and the integrity index associated with said at least one first item of information can be determined as a function of the consistency between data provided by the first perception means and the second perception means.

The method can comprise a step of acquiring at least one second item of information from said selection of information using an environment perception means at a first instant and at a second instant after the first instant, and the integrity index associated with said at least one second item of information can be determined as a function of the consistency between the data provided by the perception means at the first instant and at the second instant.

The decision to be taken can comprise a given action to be applied by the autonomous vehicle on a given deadline, with the given deadline being able to be short-term, medium-term, or long-term, and, for the same given action, the determination step can determine:

- a first selection of information to be consulted if the given deadline is short-term; or
- a second selection of information to be consulted if the given deadline is medium-term; or
- a third selection of information to be consulted if the given deadline is long-term, And the first, second and third selections can differ from each other.

The method can comprise a sub-step of providing said decision-making module with a selective environmental model comprising a set of information characterizing the situation of the vehicle after applying the decision to be taken.

The method can comprise:

- configuring a finite list of decisions taken into account by the method;
- configuring a selection of information to be consulted for each decision of the finite list of decisions, and configuring the order in which said information must be consulted;
- configuring at least one method for consulting each item of information to be consulted.

The invention also relates to a device for modeling a navigation environment of an autonomous vehicle, the autonomous vehicle being equipped with an autonomous control means. The device comprises hardware and/or software elements implementing the method as defined above, notably hardware and/or software elements designed to implement the method according to the invention, and/or the device comprises means for implementing the method as defined above.

The invention further relates to an autonomous vehicle comprising a device for modeling a navigation environment of an autonomous vehicle as defined above.

The invention also relates to a computer program product comprising program code instructions stored on a computer-readable medium for implementing the steps of the method as defined above when said program runs on a computer. The invention also relates to a computer program product that can be downloaded from a communication network and/or stored on a computer-readable data medium and/or can be executed by a computer, comprising instructions which, when the program is executed by the computer, cause said computer to implement the method as defined above.

The invention further relates to a computer-readable data storage medium, which stores a computer program comprising program code instructions for implementing the method as defined above. The invention also relates to a computer-readable storage medium comprising instructions which, when they are executed by a computer, cause the computer to implement the method as defined above.

The invention also relates to a signal from a data medium, conveying the computer program product as defined above.

BRIEF DESCRIPTION OF THE DRAWINGS

The appended drawings show, by way of an example, an embodiment of a device for modeling navigation environment of a motor vehicle.

DETAILED DESCRIPTION

Figure 1:
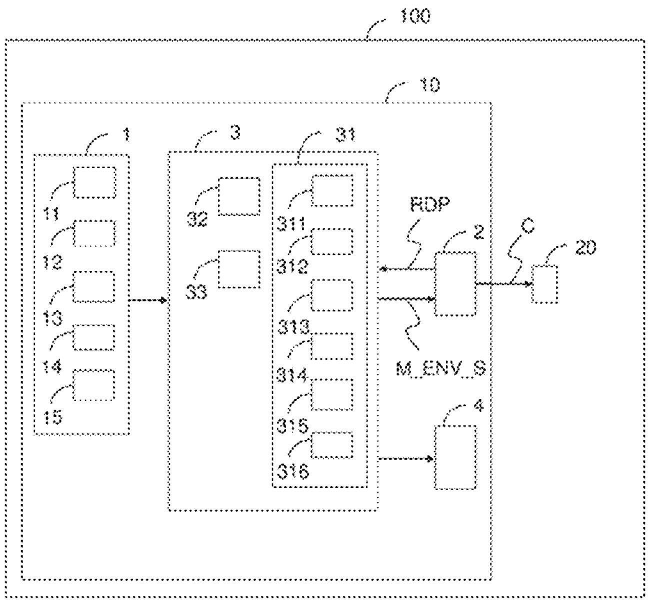
FIG. 1 shows a vehicle equipped with a modeling device.

An example of a motor vehicle 100 equipped with an embodiment of a device for modeling a navigation environment of a motor vehicle is described hereafter with reference to FIG. 1.

The motor vehicle 100 can be any type of motor vehicle, notably a passenger vehicle, a utility vehicle, a truck or even a public transport vehicle such as a bus or a shuttle. According to the described embodiment, the motor vehicle 100 is an autonomous vehicle and will be referred to as "autonomous vehicle" throughout the remainder of the description.

Therefore, this illustration is provided in a non-limiting manner. Notably, the motor vehicle could be a non-autonomous vehicle, equipped with a driving assistance system, notably a driving assistance system corresponding to a level above or equal to autonomy level 2, i.e., corresponding to partial autonomy of the vehicle.

The autonomous vehicle 100 moves in a given environment and over a given route IT. The autonomous vehicle 100 comprises a driving assistance system 10 and an autonomous control means 20 for autonomously controlling the autonomous vehicle 100.

The driving assistance system 10 transmits a movement command C for the autonomous vehicle 100 to the autonomous control means 20. The movement command C can include a longitudinal movement command and/or a lateral movement command. The longitudinal movement command can include a first torque setpoint intended for a powertrain of the vehicle and/or a second torque setpoint intended for a brake actuator of the vehicle. The lateral movement command includes an angle of rotation of the steering wheels of the autonomous vehicle 100.

The driving assistance system 10 notably comprises the following elements:

- environment perception means 1;
- a decision-making module 2;
- a computation unit 3 comprising a microprocessor 31, a local electronic memory 32 and communication interfaces 33 allowing the microprocessor to communicate with the perception means 1 and the decision-making module 2.

Optionally, the driving assistance system 10 can comprise a human-machine interface 4, intended for displaying or transmitting notifications relating to the consistency of the data received from the perception means 1.

Throughout the remainder of the document, the term "data" is used to designate a raw datum received from the environment perception means 1, and the term "information" is used to designate an interpretation constructed on the basis of an aggregation of data.

The interpretation is carried out in the computation unit 3. It allows, for example, objects of interest (vehicles, pedestrians, obstacles, road signs) to be identified in the environment of the ego vehicle.

The environment perception means 1 can comprise all or some of the following means:

- means 11 for observing the status of the vehicle; and/or
- means 12 for perceiving the environment close to the vehicle; and/or
- means 13 for geolocating the vehicle; and/or
- means 14 for linking the vehicle with a road infrastructure and/or with other vehicles; and/or
- means 15 for connecting to the Internet.

The means 11 for observing the status of the vehicle can include means for observing a data network inside the vehicle, for example, of the CAN bus type. The data transmitted via the internal data network can include, for example, instantaneous measurements of the speed and/or acceleration and/or jerking of the autonomous vehicle 100, or even the angle and the speed of rotation of the steering wheel, the status of the brake or acceleration pedals, etc.

The means 12 for perceiving the nearby environment of the vehicle can comprise radars and/or Lidars and/or cameras. Other embodiments of the perception means 12 can be contemplated.

The means 13 for geolocating the vehicle can comprise a digital navigation map and data originating from a location system, for example of the GPS type, allowing the autonomous vehicle to be located on the digital navigation map, and therefore to access information relating to the road network, notably to a topological and geometric description of the road network. The information relating to the road network can further comprise semantic information. It can be, for example, the presence of a sign indicating a rule to be followed on a section of road (maximum speed, no overtaking), or of a sign indicating the presence of a hazard (risk of animals, landslides, etc.).

The means 14 for linking the vehicle with a road infrastructure and/or with other vehicles also allow data to be obtained concerning a set of objects perceived by the road infrastructure equipment and/or other vehicles. The data notably includes data for classifying objects and their dimensions, their position, as well as the associated speeds.

The Internet connection means 15 also allow contextual data to be obtained such as the weather, the road conditions and the traffic conditions.

In order to control the autonomous vehicle 100, notably in order to determine its movement, the decision-making module 2 continuously takes decisions. These decisions include some that are intended to be implemented through commands C transmitted to the autonomous control means 20 for autonomously controlling the autonomous vehicle.

In general, the term "decision" relating to an action can be defined as the result of a deliberation relating to a voluntary act of performing said action or of not performing said action.

According to this definition, a distinction is made between:

the action relating to the decision;

the decision itself, which corresponds to the choice as to whether or not to perform the action.

In this document, the action relating to a decision can be, for example, to overtake a vehicle, to continue in the same direction, to brake in order to avoid an obstacle, to modify their route.

In order to determine a choice as to whether or not to perform an action, the decision-making module 2 can transmit an information request to the computation unit 3.

Throughout the remainder of the document:

a decision subject to an information request is referred to as "decision to be taken";

an information request, also called information request RDP, is a request for information relating to an action related to a decision, with said information allowing a decision to be taken by the decision-making module 2.

Figure 2:
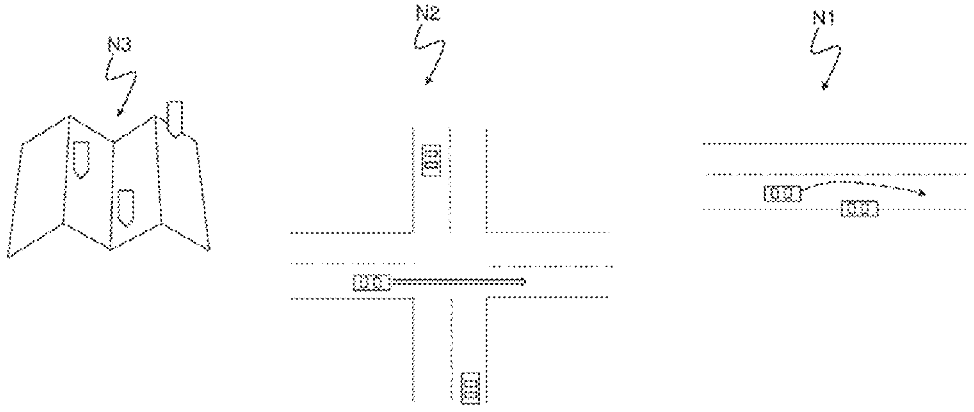
FIG. 2 schematically illustrates various levels of decisions to be taken by the autonomous vehicle.

In the embodiment illustrated in FIG. 2, at each instant t, the decision-making module 2 is capable of determining decisions to be taken according to three levels:

a first decision-making level N1, called operational level, relating to short-term decisions, for example, decisions to be taken between the present instant t and a future instant of t+1 second;

a second decision-making level N2, called tactical level, relating to medium-term decisions, for example, decisions to be taken between the instant t+1 second and the instant t+10 minutes;

a third decision-making level N3, called strategical level, relating to long-term decisions, for example, decisions to be taken over more than 10 minutes relative to the present instant.

The first decision-making level N1 determines the responsiveness of the vehicle with respect to its immediate environment, such as, for example, precisely following a trajectory, or avoiding obstacles. The decision-making module 2 continuously determines the decisions of the first level. These are decisions that must be taken within a few hundred milliseconds at most.

The second decision-making level N2 relates to maneuvers, such as, for example, the commitment of the autonomous vehicle 100 at an intersection, as a function of the priority rules and the presence of other road users traveling across said intersection, or approaching said intersection. These decisions are taken periodically and correspond to a set of well-defined situations.

The third decision-making level N3 relates to the overall movement of the vehicle. For example, for an autonomous vehicle, it can involve determining a route connecting a point A to a point B. These are decisions that are directly dependent on the mission of the vehicle, and that are taken fairly rarely (once at the start of a mission, and sometimes during the mission).

Figure 3:
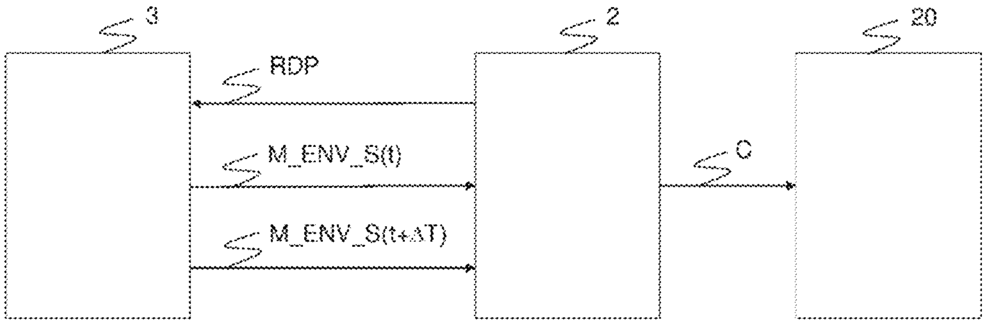
FIG. 3 illustrates the sequencing of the exchanges between the components of the modeling device.
Figure 4:
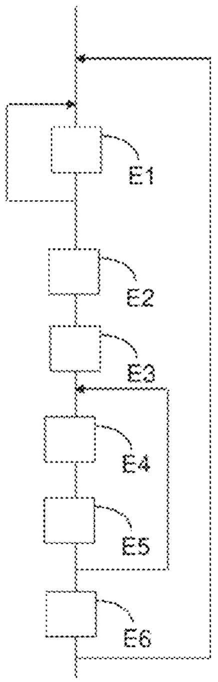
FIG. 4 shows a flowchart of an embodiment of a modeling method.

FIG. 3 illustrates the sequence for a decision to be taken by the autonomous vehicle, i.e., the sequencing of the exchanges between the computation unit 3, the decision-making module 2 and the autonomous control means 20 for controlling the autonomous vehicle 100.

At a given instant t, a decision to be taken DP is defined by the decision-making module 2, notably as a function of the route IT over which the autonomous vehicle is commanded to move.

Before being transmitted to the autonomous control means 20 in the form of a command C, the decision to be taken DP involves at least one exchange of information between the decision-making module 2 and the computation unit 3.

The exchange of information comprises;

firstly sending, from the decision-making module 2 to the computation unit 3, an information request RDP for information relating to a decision to be taken DP originating from the decision-making module 2; then secondly sending, from the computation unit 3 to the decision-making module 2, a selective environmental model M_ENV S_(t), with the environmental model M_ENV_S(t) being defined at the instant t and as a function of the decision to be taken DP; then optionally, thirdly sending, from the computation unit 3 to the decision-making module 2, a selective environmental model M_ENV_S(t+Δt), with the environmental model M_ENV_S(t+Δt) being defined at an instant t+Δt and as a function of the decision to be taken DP; then fourthly sending, from the decision-making module 2 to the autonomous control means 20, a command C to move the vehicle so as to apply the decision DP.

Throughout the remainder of the document, an information request relating to a decision to be taken that is transmitted by the decision-making module 2 to the computation unit 3 is called "information request RDP".

The computation unit is able to receive an information request RDP originating from the decision-making module and to create a specific environmental model M_ENV_S of the autonomous vehicle with 100, the specific environmental model M_ENV_S comprising the information required for evaluating the decision to be taken DP by the decision-making module 2, relative to the current situation of the vehicle.

Throughout the remainder of the document, the term "situation of a vehicle" is used to designate a selection of elements of the driving scene from among all the elements that can be perceived via the perception means 1. An element be another road user, an object, a surface, a navigation path, etc. The elements of the driving scene are selected function as a function of their relevance with respect to the decision to be taken DP. The situation also depends on the route IT that the vehicle must follow. For example, when crossing an intersection, the situation of a vehicle differs depending on whether it has to go straight on, or turn left. Indeed, depending on the direction that the vehicle must take, the situation of the vehicle will not take into account the same users located in the zone of the intersection. The situation of the vehicle can also include the relationships between the various elements of the driving scene. For example, the situation can include a link between an obstacle and a nearby vehicle, with the nearby vehicle then being able to modify its trajectory in order to avoid the obstacle, which can interfere with the decisions of the autonomous vehicle 100.

The specific environmental model M_ENV_S includes the information required to model the situation of the vehicle relative to a decision to be taken DP. The analysis of the information request RDP by the computation unit 3 therefore involves determining a selection of information or parameters to be consulted. Based on the data derived from the perception means 1, and from the selection of parameters to be consulted, the computation unit 3 constructs a selective environmental model M_ENV_S of the environment of the autonomous vehicle 100.

In the embodiment of the invention, the computer 31 allows software to be executed that includes the following modules that communicate with each other:

- a module 311 for defining an overall environmental model M_ENV_G of the autonomous vehicle 100, which communicates with the environment perception means 1, the decision-making module 2 and the human-machine interface 4;
- a module 312 for receiving an information request RDP relating to a decision to be taken DP, which communicates with the decision-making module 2;
- a module 313 for determining a selection of information BP or parameters to be consulted;
- a module 314 for acquiring said selection of information in order to form a selective environmental model M_ENV_S;
- a module 315 for determining an integrity index associated with each item of information of the environmental model M_ENV_S; and
- a step 316 of transmitting the selection of information M_ENV_S, which collaborates with the decision-making module 2.

A mode for executing the method for controlling an autonomous vehicle is described hereafter with reference to FIG. 3. The method comprises six steps E1 to E6.

In the first step E1, an overall environmental model M_ENV_G of the autonomous vehicle 100 is defined comprising a set of information determined from the data provided by the environment perception means.

The overall environmental model M_ENV_G is constructed according to the following objectives:

- providing a set of sufficiently accurate and complete information concerning the environment of the autonomous vehicle to allow the decision-making module 2 to operate, notably to allow decisions to be taken to be identified;
- ensuring the consistency of the information.

To this end, a computed integrity index IC is assigned to each item of information of the model M_ENV_G. The computation of the index IC can take into account an initial integrity index of a datum, with the initial integrity index being provided by the means for perceiving said datum.

The index IC also takes into account the consistency of the data. In particular, for each datum that can be provided by at least two distinct and independent perception means, the index IC is determined as a function of the difference between the respective measurements of each of the perception means, and/or as a function of the confidence index assigned to each of the measurements.

A consistency check also relates to the temporal evolution of each datum. For example, the sudden appearance or disappearance of an object, or even a highly unlikely trajectory of an element of the scene, are detected. For example, a consistency check can relate to the order of magnitude of the speed of movement of vehicles or pedestrians.

A consistency check can more broadly relate to operating limits of the driving assistance system 10. Indeed, the driving assistance system 10 is defined so as to operate in a traffic environment that checks very specific criteria, which are formalized in a document called ODD (Operational Design Domain). For example, the driving assistance system 10 could have been designed to operate in a controlled environment, in which no pedestrian is supposed to move. In this case, the decision-making module 2 is not designed to be capable of interacting with pedestrians; however, the perception system is capable of detecting pedestrians. Therefore, the presence of a pedestrian will be detected in step E1 as being incompatible with the traffic environment for which the autonomous vehicle 100 has been designed.

Detecting an incompatibility in the data or information can trigger a warning message to be sent to the decision-making module 2 and/or to the human-machine interface 4. The warning message can specify the incompatible data item(s).

Thus, in step E1, each time a datum is received from the perception means, the overall environmental model M_ENV_G is enhanced and updated, then it is stored in the memory 32.

As long as no information request RDP is transmitted by the decision-making module 2, the method loops back to the step E1 of defining an overall environmental model M_ENV_G.

When an information request RDP is transmitted by the decision-making module 2, the method transitions to the step E2 of receiving an information request relating to a decision to be taken for controlling the vehicle.

In step E2, the content of the received information request RDP is analyzed.

Advantageously, a predefined list of decisions LD is stored in the memory 32. Indeed, there is a finite number of decisions that a vehicle can be made to take. For example, at the tactical level, a decision can be crossing an intersection, a change of lane, staying on the same traffic lane, etc.

In one embodiment, the list LD identifies each decision to be taken using an identifier iDP, and the information request RDP advantageously includes a decision identifier iDP.

The information request RDP can also include an item of information specifying a decision-making level: tactical, operational or strategical.

The information request RDP can also include information relating to the route IT followed by the autonomous vehicle 100.

The different information contained in the information request RDP can be stored in the memory 32 and used when executing the subsequent steps E3 to E6.

In step E3, a selection of information required to take the decision DP is determined, with the selection being a sub-set of the set of information contained in the overall environmental model M_ENV_G.

Advantageously, the memory 32 comprises a correspondence table between, on the one hand, an identifier iDP of a decision to be taken and, on the other hand, a list containing the information required to take the decision designated by the index iDP. This correspondence table thus allows a list BP of information to be determined that is required in order for the decision-making module 2 to make the decision DP.

Throughout the remainder of the document, said list of information BP is called "Blueprint". A Blueprint BP is associated with each decision to be taken DP, i.e., with each decision identifier iDP. It formalizes and structures each item of information for which the decision-making module 2 needs to evaluate the decision and subsequently transmit commands to the autonomous control means 20 for controlling the autonomous vehicle 100. A Blueprint can be considered to be a blank form, each field of which must be completed, with the fields to be completed being specific to each Blueprint, i.e., each decision to be taken DP.

A Blueprint can depend on the level of the decision (tactical, operational or strategical), Notably, for a given decision, one Blueprint can exist per decision-making level.

For example, in the case of a decision to enter an intersection, a first level tactical Blueprint BP1 defines the information required in order to take the decision to enter the intersection at a time of arrival of the vehicle at the intersection. This Blueprint can include the following information:

- the condition of the traffic in the driving lane of the autonomous vehicle 100;
- the list of the zones of interest (for example, the other lanes for entering the intersection) and the condition of the traffic in these zones of interest;
- the list of priority vehicles relative to the autonomous vehicle 100;
- the list of non-priority vehicles relative to the autonomous vehicle 100;
- the presence of traffic lights and the status of these traffic lights.

With further reference to the case of a decision to enter an intersection, a second Blueprint BP2, different from the first Blueprint BP1; can be defined for the operational level, and, optionally, a third Blueprint BP3, different from the first and second Blueprints BP1, BP2, can be defined for the strategical level. For example, the Blueprint BP3 (strategical level) could take into account congested road portions or blocked roads that could compromise the route computed at the start of the mission.

The list of required information, or Blueprint, can include a prediction. Throughout the remainder of the document, the term prediction is used to designate predictable events that can impact the decisions to be taken by the autonomous vehicle 100. For example, a prediction can relate to a predictable behavior of a nearby vehicle that could affect the behavior of the autonomous vehicle 100. The term "prediction" therefore does not only relate to trajectory prediction. It can also relate to, for example, a prediction of the intention of a nearby vehicle, or a prediction of a route of a nearby vehicle.

The list of information required to take a decision DP can include a set of information characterizing the situation of the vehicle after applying the decision to be taken DP.

The prediction can then take into account the route IT provided by the decision-making module 2, in association with the decision to be taken DP.

Figure 5:
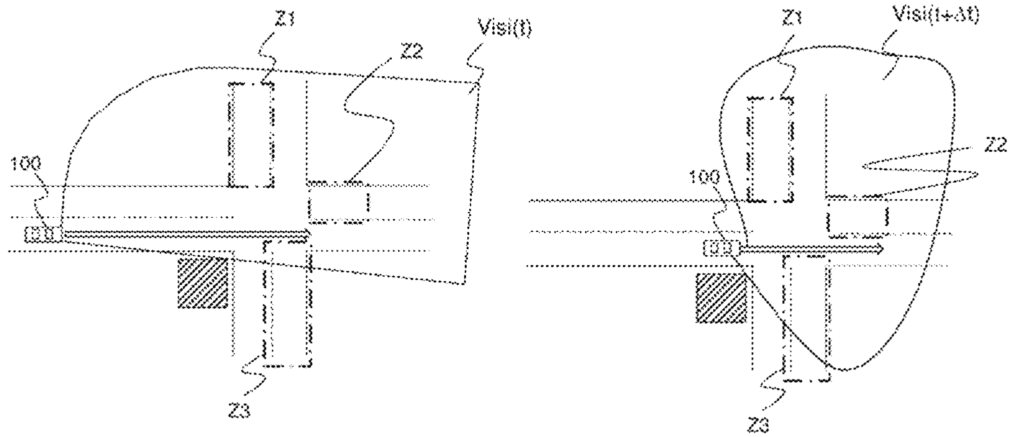
FIG. 5 illustrates a first situation in which the modeling method implements a prediction.

The situation shown in FIG. 5 illustrates the advantage of including a prediction in the Blueprint associated with a decision to be taken DP.

FIG. 5 includes:

- a first diagram (located on the left-hand side of the figure), showing the autonomous vehicle 100 at an instant t, while it moves toward a crossing that it must cross in a straight line; and
- a second diagram (located on the right-hand side of the figure), showing the autonomous vehicle 100 at an instant t+Δt, while it has almost reached the crossing.

Three zones of interest Z1, Z2, Z3 for the autonomous vehicle 100 are shown on each diagram, as well as the visibility Visi(t) or Visi(t+Δt) of the autonomous vehicle on these three zones of interest, respectively at the instants t and t+Δt.

In the first diagram, showing the situation of the autonomous vehicle at the instant t, a building located on the corner of the crossing obscures the visibility Visi(t) on the zone of interest Z3 located to the right of the autonomous vehicle 100.

In the second diagram, showing the situation of the autonomous vehicle at t+Δt, the zone of interest Z3 situated to its right is now in the visibility zone Visi(t+Δt).

Thus, although information concerning the zone of interest Z3 is missing at the instant t, the prediction at t+Δt allows the decision-making module to ensure that, when the autonomous vehicle 100 arrives at the crossing, all the zones of interest will be covered by the perception means 1.

The prediction also allows the decision-making module to anticipate incidents that could occur after applying the decision DP.

Figure 6:
FIG. 6 illustrates a second situation in which the modeling method implements a prediction.

For example, in the situation illustrated in FIG. 6:

- at the instant t of evaluating the decision to be taken, shown by the diagram located on the left-hand side, the navigation path of the autonomous vehicle 100 is completely free, and a second vehicle is traveling in the opposite lane;
- at the prediction instant t+Δt, in order to avoid an obstacle, the second vehicle has moved into the lane of the autonomous vehicle 100 and creates a collision risk.

Thus, although the situation is safe at the instant t, it is pertinent that the decision-making module 2 knows that the second vehicle will probably avoid the obstacle and encroach on the lane of the autonomous vehicle 100, and estimates when this risk is likely to occur.

When the selection of information associated with the decision to be taken DP, in other words the Blueprint, is determined, the method proceeds to step E4.

In step E4, said selection of information is acquired from the data originating from the environment perception means. In other words, the Blueprint is consulted, which is a kind of form containing fields to be consulted, based on the information of the environmental model M_ENV_G.

In an advantageous embodiment, the data is acquired in accordance with the same method, irrespective of the Blueprint.

In this embodiment, a set of unitary functions is defined. By way of a non-limiting example, unitary functions can be respectively defined for:

- identifying zones of interest;
- identifying a vehicle that precedes the autonomous vehicle 100 on its traffic lane;
- identifying the one or more vehicles with priority over the autonomous vehicle 100 at an intersection;
- predicting a trajectory of a nearby vehicle, etc.

Each unitary function uses information from the overall environmental model M_ENV_G in order to construct a structured representation of part of the current situation of the autonomous vehicle 100.

In order to complete a Blueprint, a selection of unitary functions needs to be executed, with each unitary function allowing information to be consulted concerning the Blueprint. In addition, the unitary functions may need to be executed in a properly defined order. For example, in order to consult the representation of an intersection on the tactical level, the zones of interest may need to be identified before identifying the road users with priority over the autonomous vehicle 100.

To this end, a road sheet is associated with each Blueprint in order to describe the order for executing the unitary functions for consulting the data of the Blueprint. A monitoring function (or orchestrator) will execute the unitary functions in the order defined by the road sheet.

For example, when the decision to be taken DP relates to the commitment of the autonomous vehicle 100 at an intersection, the road sheet can determine the following order for executing the unitary functions:

- obtaining the status of the autonomous vehicle 100 (position, speed, etc.);

obtaining the status of the field of view of the perception system;

obtaining the information concerning the presence of other road users around the autonomous vehicle 100, as well as their status;

obtaining the zones of interest of the intersection, their position and/or their spatial distribution;

contextualizing the zones of interest (i.e., if they are visible, hidden, out of range, etc.);

contextualizing the other road users present in the zones of interest;

identifying the road users who should be given priority;

identifying the road users who should cede priority;

etc.

The set of unitary functions is scalable, i.e., each of the functions can be modified without undermining the overall architecture of the system. In addition, new functions can be added, for example, in order to take into account new situations.

In a preferred embodiment, the step E4 of acquiring and the step E5 of determining an integrity index are executed successively for each unitary function. In other words, for each unitary function, the method loops back to steps E4 and E5. Each unitary function can compute, for example, an integrity index from an integrity index associated with each item of information of the overall environmental model M_ENV_G defined in step E1.

In this embodiment, for each step of the road sheet, the orchestrator is capable of estimating the quality and the completeness of the information gathered by the unitary function executing said step.

Based on the integrity index returned by each unitary function, the orchestrator updates an overall integrity index.

Moreover, the orchestrator can analyze whether the integrity indices returned the by unitary functions executed at this stage of the road sheet are high enough to continue executing the road sheet. This analysis is essential, since if one of the unitary functions gathers incomplete or insufficiently accurate information, it is then possible for the following unitary functions to be affected.

Depending on the situations, the lack of integrity of the information can be managed by the orchestrator in various ways:

the road sheet can be fully executed, then the decision-making module 2 can be notified of the low level of integrity of the information via the overall integrity index computed by the orchestrator; or the orchestrator can apply conditions for stopping the execution of the road sheet; for example, if the overall integrity index is below a predefined integrity threshold associated with the Blueprint, the orchestrator can interrupt the progress of the road sheet.

On completion of the execution of the road sheet, the information gathered by the unitary functions together forms a selective environmental model M_ENV_S.

In step E6, the decision-making module 2 is supplied with the selective environmental model M_ENV_S, with the model M_ENV_S comprising the unitary and overall integrity indices associated with the data.

Finally, the modeling method according to the invention implements an efficient and reliable interpretation of the situation of the autonomous vehicle 100 as a function of a decision to be taken by the autonomous vehicle 100.

Indeed:

the modeling according to the invention only takes into account the information required for decision-making;

it guarantees that the information that is identified as being required will be as complete as possible and that the reliability of the information will be known;

a decision to be taken will result in different models depending on the deadline by which the decision must be taken, i.e., according to the decision-making level (operational, tactical or strategical);

the modeling can include a prediction for anticipating incidents that could occur after applying the decision to be taken;

the consistency of the information is checked in various ways: consistency of an item of information originating from several sources, temporal consistency of the information, and consistency of the information with operating limits of the system.

In addition, the proposed modeling method is generic and can be adapted to the requirements of various driving assistance and/or autonomous driving systems. Indeed, the method can be configured at various levels:

a first overall configuration level is implemented on the list LD of possible decisions;

a second configuration level per decision is implemented by associating a Blueprint with each possible decision (i.e., a set of information to be consulted), with the possibility, for the same decision, of using a different Blueprint per decision-making level (operational, tactical and strategical);

a third configuration level is implemented by defining a set of unitary functions, with each unitary function allowing an item of information to be acquired and associated with an integrity index;

a fourth configuration level relates to the order for acquiring the information, i.e., the order for executing the unitary functions, and the computation of an overall integrity index for the information. The fourth configuration level is carried out by defining a road sheet associated with each Blueprint.

This modular architecture allows the modeling to be simply configured as a function of each decision, by modifying the list of decisions and/or the Blueprint(s) associated with each decision and/or the road sheet associated with each Blueprint and/or the unitary functions used to acquire the information.

Naturally, as can be seen from the above description, the modeling that is implemented must be understood in the practical sense of automatically understanding the environment of a vehicle, with the aim of assisting the driving thereof in a reliable, sound and optimized manner. Therefore, it is not an abstract or virtual construction. In other words, the invention must be understood to be a method and a device for assisting the driving of a motor vehicle, whether or not it is autonomous, that implements the method for modeling a navigation environment as described above, in order to take this environment into account in one or more autonomous decisions for guiding a vehicle, or even for assisting the driving of a driver of a vehicle.

The invention claimed is:

1. A method for modeling a navigation environment of a vehicle equipped with environment perception means, a decision-making module, and autonomous control means for autonomously controlling the vehicle, the method comprising:

defining an overall environmental model of the vehicle as being a set of structured information constructed from data provided by the environment perception means;

receiving a request for information relating to a decision to be taken for controlling the vehicle by the autonomous control means, the request being transmitted by the decision-making module and including an item of information specifying a decision-making level from among multiple decision-making levels;

determining, from among the set of structured information defining the environmental model, a selection of information to be consulted in order to take said decision, the selection of information being dependent upon the item of information specifying the decision-making level that is provided with the request;

consulting the information from said selection from the overall environmental model;

determining an integrity index associated with each item of information of said selection; and providing said decision-making module with a selective environmental model containing the information from said selection and the corresponding integrity indices.

2. The method for modeling a navigation environment of an autonomous vehicle as claimed in claim 1, further comprising:

acquiring at least one first item of information from said selection of information using first environment perception means and using second environment perception means, wherein the integrity index associated with said at least one first item of information is determined as a function of a consistency between data provided by the first perception means and the second perception means.

3. The method for modeling a navigation environment of an autonomous vehicle as claimed in claim 1, further comprising:

acquiring at least one second item of information from said selection of information using an environment perception means at a first instant and at a second instant after the first instant, wherein the integrity index associated with said at least one second item of information is determined as a function of a consistency between the data provided by the perception means at the first instant and at the second instant.

4. The method for modeling a navigation environment of an autonomous vehicle as claimed in claim 1, wherein the decision to be taken comprises a given action to be applied by the autonomous vehicle on a given deadline, with the given deadline being short-term, medium-term, or long-term, wherein, for the same given action, the determining the selection of information determines:

a first selection of information to be consulted when the given deadline is short-term; or a second selection of information to be consulted when the given deadline is medium-term; or a third selection of information to be consulted when the given deadline is long-term, wherein the first, second, and third selections differ from each other.

5. The method for modeling a navigation environment of an autonomous vehicle as claimed in claim 1, further comprising:

providing said decision-making module with a selective environmental model comprising a set of information characterizing a situation of the vehicle after applying the decision to be taken.

6. The method for modeling a navigation environment of an autonomous vehicle as claimed in claim 1, further comprising:

configuring a finite list of decisions taken into account by the method;

configuring a selection of information to be consulted for each decision of the finite list of decisions, and configuring the order in which said information must be consulted; and configuring at least one method for consulting each item of information to be consulted.

7. A device for modeling a navigation environment of an autonomous vehicle, the autonomous vehicle being equipped with an autonomous control means, the device comprising hardware and/or software elements configured to implement the method for modeling a navigation environment of an autonomous vehicle as claimed in claim 1.

8. A non-transitory computer-readable data storage medium, which stores a computer program that, when executed by a computer, causes the computer to execute the method as claimed in claim 1.

* * * * *